United States Patent [19]

Chu

[11] Patent Number: 5,141,526
[45] Date of Patent: Aug. 25, 1992

[54] FUEL PREPARATION FROM A WASTE SLUDGE

[75] Inventor: Humbert H. Chu, Houston, Tex.

[73] Assignee: Shell Oil Company, Houston, Tex.

[21] Appl. No.: 702,568

[22] Filed: May 20, 1991

[51] Int. Cl.⁵ .............................................. C10L 7/00
[52] U.S. Cl. ...................................... 44/576; 44/589; 44/605; 106/747; 106/755; 106/758; 210/777
[58] Field of Search .............. 110/346; 44/552, 280, 44/550, 561, 563, 564, 567, 572, 576, 589, 605; 106/739, 747, 755, 748, 749, 758; 210/777, 778

[56] References Cited

U.S. PATENT DOCUMENTS 4,168,670  9/1979  Wall et al. ............................ 110/346
4,247,403  1/1981  Foley et al. ........................... 252/8.5
4,563,344  1/1986  Kotz et al. ............................ 424/17

OTHER PUBLICATIONS

Kirk–Othmer's Encyclopedia of Chemical Technology, 3rd e.d., vol. 5 Wiley, 1978, pp. 180 ff.

Primary Examiner—Frank Sever

[57] ABSTRACT

Waste sludge that contains water, solids and oil, is mixed with a filter aid that has filter aid characteristics and a heating value of at least 1,000 Btu/lb. The admixture obtained is subjected to filtration yielding a high-Btu combustible material, useful as fuel. This combustible material, optionally after drying to remove water, is very suitable for use as fuel in a cement kiln.

20 Claims, No Drawings

FUEL PREPARATION FROM A WASTE SLUDGE

FIELD OF THE INVENTION

The present invention relates to the preparation of a fuel from a waste sludge that contains solids and oil by means of filtration. It relates in particular to the use of the filter cake obtained by such filtration as fuel in a cement kiln.

BACKGROUND OF THE INVENTION

Waste streams are a growing concern to the environment. Authorities impose increasingly stringent requirement as to the disposal of waste streams. In refineries waste sludges are obtained during the work up of crude oil fractions. Such sludges may include water, salt, catalyst wastes, dirt like sand, and heavy oil. Sludges like these are not allowed to be disposed of without pre-treatment.

A suitable pre-treatment could comprise a filtration to separate the solids from the liquids. Problems that could arise in connection with filtration relate to filtration rates, moisture content of the filter cake obtained and leachability of metal ions from the filter cake. The problem of filtration rate can be encountered by the use of filter aids. In the industry the use of diatomaceous earth as filter aid is well-known. A way to solve the leachability problems resides in the fixation of the metals in cement. Thereto the waste may be mixed with cement and the admixture may be allowed to set and a solid hard material is obtained which passes the leachability requirements set by the authorities. Another way to solve the problem of the metal ions is to incorporate the metal ions into the cement. Hence, it has been proposed to use solid material resulting from the filtration of waste as fuel in cement kilns so that the metal ions contained in such material would be retained in the cement produced in the kiln. Cement producers, however, set certain requirements as to the quality of the material to be used as fuel. One such requirement is that the heating value of the material is at least 5,000 Btu/lb (1 Btu/lb equals 2.32444 J/g). Another requirement is that the moisture content in the material does not exceed 10% wt, based on the total material. A third requirement is that the material is non-sticking to enable pneumatic transportation.

It is evident that the use of diatomaceous earth as filter aid only aids in solving any filtration problems. It does not contribute to the heating value of the eventual material that may be used as fuel.

It is an object of the present invention to provide a process in which both filtration rate is improved and the resulting material has a high heating value, so that it can be used as fuel.

It is another object of the invention to provide for a fuel that can be used in a cement kiln and fulfills the requirements set by the cement manufacturers.

It is a further object of the invention to provide for a process of producing cement using a fuel obtained from waste sludges.

Another object of the invention is to produce non-sticking dried material from refinery waste sludge as solid fuel for a cement kiln which material has satisfactory moisture and oil content and an acceptable heating value.

SUMMARY OF THE INVENTION

The present invention therefore relates to a process for the preparation of a fuel from a waste sludge that contains water, solids and oil, which process comprises adding a filter aid having filter aid characteristics and a heating value of at least 1,000 Btu/lb to the waste sludge, and subsequently subjecting the admixture obtained to filtration.

It further relates to combustible material comprising oil, waste solids and a filter aid with filter aid characteristics and a heating value of at least 1,000 Btu/lb.

The invention also provides for a process for the preparation of cement clinker, in which cement starting material is fed to a kiln at one end and cement clinker is withdrawn therefrom at the other end, and solid fuel is combusted with a free oxygen-containing gas at the other end of the kiln and combustion gases are passed counter-currently to the cement starting material through the kiln to heat the cement starting material, in which process a combustible material is used as solid fuel that comprises oil, waste solids and a filter aid with filter aid characteristics and a heating value of at least 1,000 Btu/lb.

DETAILED DESCRIPTION OF THE INVENTION

In the present process a filter aid with a heating value of at least 1,000 Btu/lb is used. Due to the addition of such a filter aid the filter cake will not only comprise the combustible material from the waste sludge, but will also contain combustible material in the form of this filter aid. It is evident that this represents a considerable advantage over the use of diatomaceous earth as filter aid. Due to the filter aid characteristics the filtration rate during the filtration is improved.

As filter aid, material can be used that is usually granular or fibrous with a capability to form a highly permeable filter cake in which fine solids may be trapped. Filter aids have generally a relatively low bulk density, e.g. below about 75 lb/ft$^3$, preferably below about 40 lb/ft$^3$. They are also generally porous so that the flow resistance is minimized. Suitably, the filter aid has as characteristics a porosity of 2 to 100, preferably 5 to 30 darcy and a density of 5 to 1200, preferably 50 to 650 kg/m$^3$. It further suitably has an average particle size of 5 to 3000, preferably from 50 to 1000 micrometers. Such particle size generally ensures that filters are not blinded by the mixture of waste sludge and filter aid.

The heating value of the filter aid adds to the heating value of the filter cake. Generally, a heating value of at least 1,000 Btu/lb is required. Advantageously, a filter aid with a heating value of at least 3,000, preferably at least 5,000 Btu/lb, is used. The heating value may suitably be up to a value of 20,000 Btu/lb. Good results are obtainable with filter aids having a heating value from 7,500 to 16,000 Btu/lb.

Although any filter aid can be used in the present process that fulfills the requirements of having filter aid characteristics and a heating value of at least 1000 Btu/lb, it is preferred to use a filter aid containing one or more ground corncob fractions. In this respect reference is made to U.S. Pat. Nos. 4,247,403 and 4,563,344 disclosing the use of corncob-derived adsorbent as a circulation additive for drilling muds and as a controlled release agglomerated carrier for pesticides, respectively. It is further known to use such corncob-derived adsorbent in the clean-up of oil spills by allowing the adsorbent to soak up the spilled oil. Preferably, the filter aid contains particles of a ground predominantly woody ring-containing fraction of corncobs. Such fractions may be essentially free of the chaff and pith portion of the cob. An advantage of employing this specific filter aid resides in the circumstance that the corncob-derived fractions adsorb oil from the sludge. That implies that this oil, with a positive heating value, adds to the heating value of the filter cake, whereas there is no sign of free oil. That is a major advantage since requirements by authorities may be such that the presence of free oil in fuel, e.g. for cement kilns, is forbidden. Added to the heating value of the filter aid itself, which may amount to about 7,900 Btu/lb, this means that a product with a substantial heating value is attainable with the present invention. The density of this filter aid also compares well with that of the most common one, viz. diatomaceous earth. The density of the corncob-derived filter aid may be about 28 to 30 lb/ft$^3$ (448.5 to 480.6 kg/m$^3$), whereas the density of diatomaceous earth may comprise 50 to 75 lb/ft$^3$ (800.9 to 1201.4 kg/m$^3$). The use of lower density filter aids also results in reduced transportation costs.

The waste sludge which is treated in the process of the invention can in principle be any water-, solids- and oil-containing waste sludge. The sludge is suitably a waste stream of an oil refinery. Such sludges contain catalyst fines from refinery operations, which fines may contain metal compounds which were deposited thereon for reasons of catalysis. The sludge may further comprise salt and water which may result from the transportation of e.g. the crude oil that is refined in the refinery. Another component of such waste sludges may be constituted of residual oily fractions from refinery operations. It is therefore evident that the sludge may comprise significant amounts of water. Typical waste sludges may comprise from about 5 to 80% wt of oil, from about 2 to 80% wt of solids and from 2 to 90% wt of water, the percentages being based on the total weight of oil, solids and water.

The filtration per se is suitably carried out by applying reduced pressure suction or by pressing under a relatively low pressure of nitrogen or another inert gas. By using such mild filtration conditions oil, adsorbed by the filter aid, is retained therein.

The product obtained after filtration may still contain an amount of water. Since water has a negative heating value and further adds to transportation costs, if any, it is desired to dry the product obtained by the filtration. Suitably the drying is carried out such that the product contains less than 10 percent by weight of water, based on the total product. The drying may be done by known methods, e.g. by heating, blowing air that may or may not have been heated, placing the product in vacuum, etc. The drying may be carried out at a temperature slightly (e.g. about up to 10° C.) above the boiling point of water at the prevailing pressure. Suitably the temperature ranges from ambient to about 200° C., preferably from about 100° to about 110° C. The drying can be carried out by indirect steam heating or steam injection, aided by agitation. The use of such a low temperature is another advantage of the present invention since, conventionally, higher temperatures, e.g. above 250° C., are used. The product is preferably dried at about atmospheric pressure, though sub- or super-atmospheric pressures may be employed as well. Preferably, the addition of the filter aid to the waste sludge, the filtration and the drying is carried out in a single vessel. A suitable apparatus is disclosed in U.S. Pat. No. 4,622,152. This apparatus comprises a mixing and plowing means within a vessel that has one or more filter units. It is possible to provide this vessel with a steam jacket. The apparatus allows the consecutive steps of mixing, filtration and drying to take place in one single vessel. The filtration can be carried out by sucking vacuum from outside the vessel through the filter units, or by pressurizing the vessel, e.g. with nitrogen or another inert gas.

In such a process a substantial amount of the oil and grease, present in the sludge, is retained in the solids.

The amount in which the filter aid is added to the waste sludge may vary within wide limits, as will be appreciated by a person skilled in the art. Such amount may depend on the nature and quantity of the solids in the waste sludge, but it may also depend on the desired heating value of the resulting filter cake. Suitably the amount in which the filter aid is added to the waste sludge ranges from about 5 to 200% wt, based on solids in waste sludge. Preferably, such amount is from about 10 to 150% wt.

As stated before, the invention also relates to a combustible material comprising oil, solids and a filter aid with filter aid characteristics and a heating value of at least 1,000 Btu/lb. Such material is preferably obtained by the process as described above. In view of the requirements set by the cement kiln producers the heating value of this combustible material suitably is at least 5,000 Btu/lb. The value for such heating value may amount up to about 18,000 Btu/lb. The heating value of the combustible material is enhanced by the fact that the filter aid material adsorbs some oil, as is the case when corncob-derived material is used as filter aid. The heating value of the combustible material depends to an extent on its moisture content. The combustible material that has been obtained by the process as described above is therefore generally dried. Preferably the drying is carried out such that a combustible material remains that contains less than about 10% wt of water, based on total material. The drying can easily be accomplished by conventional methods. Heating at a temperature slightly above about 100° C., aided by agitation, is a suitable method.

The composition of the combustible material may depend on the nature and the amount of the solids in the waste sludge and on the amount of the filter aid added. Suitably the combustible material comprises from about 10 to 90% wt of waste solids, from 5 to 75% wt of oil and from 5 to 50% wt of filter aid, based on total material. The water content is as discussed above preferably below 10% wt. Such compositions generally ensure a sufficiently high heating value of the combustible material. The filter aid used contains preferably ground corncob fractions. More in particular, it contains particles of a ground predominantly woody ring containing fraction of corncobs. Such fractions may be essentially free of the chaff and pith portion of the cob.

As stated hereinbefore, the combustible material obtained in the present invention is excellently suitable for use as fuel, particularly as fuel in a cement kiln. In such a kiln dried and ground raw materials, such as limestone, cement rock, oyster shells, shale, clay, sand and iron ore, are fed into one end of a kiln, generally a rotary kiln, while at the other end of the kiln fuel is burned and counter-currently the raw materials are contacted with the hot combustion gases to yield cement clinker. For general information on cement manufacture reference is made to Kirk-Othmer's Encyclopedia of Chemical Technology, 3rd ed., Vol. 5, Wiley, 1978, pages 180 ff.

The cement kiln is suitably operated at ambient pressure. The temperature in the cement kiln varies significantly since in the kiln both the actual clinker burning and rapid cooling of the burnt clinker take place. The temperature of the clinker burning may be up to about 3000° C.

The advantages of employing the combustible material of the present invention as fuel in a cement kiln reside in that the waste solids provide for some cement raw material in the form of metal compounds such as silica, alumina, lime and rare earth metal compounds that may be comprised in the waste solids. Since such compounds are incorporated in the cement clinker, there is little chance, if any, that metal compounds that may be harmful will be leached out of the cement resulting from employing such cement clinker. As already indicated before, due to the heating value of the filter aid and of the oil adsorbed by the filter aid and any oil retained in the solids following filtration under vacuum or under low pressure by an inert gas and low temperature drying, the combustible material has a sufficiently high heating value whereas it is a low cost fuel. In this manner both the waste disposal and the cement manufacture benefit from the present invention.

The invention is further illustrated by the following example.

EXAMPLE

From a refinery waste stream containing oil, water, and about 8.3% wt of solids, two 500 ml samples were separated. One sample ("Sample A") was filtered over a 1000 ml Buchner funnel and Whatman filter paper under vacuum until no free liquid was visible anymore. The filtration time was recorded and amounted to about 3.5 hours. The oil content in the filtrate was 105 ml.

The second sample ("Sample B") was mixed with about 41 grams of a corncob-derived material sold under the trademark DRIZORB II (ex The Andersons, Maumee, Ohio, U.S.A.), i.e., about 100% wt based on the solids in the sample. The heating value of the corncob-derived material was about 7900 Btu/lb. The mixture obtained was stirred and subjected to a similar filtration as Sample A. The filtration time was about 1.5 hours and the oil content in the filtrate was 35 ml.

From these experiments it is apparent that the corncob-derived filter aid has a beneficial effect on the filtration and also retains oil in the filter cake.

The filter cake of Sample B was dried at 101° F. for 3 hours. Subsequently the moisture content was determined, as well as the oil and grease content and heating value. The dried filter cake was non-sticking. For comparison reasons, a filter cake obtained from a similar refinery waste stream via centrifuging without any filter aid, was conventionally dried at 450° F. (232° C.). The solids obtained therefrom ("Sample C") were non-sticking, too. The same parameters as for the solids from Sample B were determined for Sample C. The results are shown in the table below.

TABLE

| | Solids From Sample B | Sample C |
|---|---|---|
| Moisture content, % wt | 3.4 | 5 |
| Oil and grease content, % wt | 56.9 | 8.2 |
| Heating value, $10^3$ Btu/lb. | 13.6 | 4.45 |

From the table it is apparent that the invention provides solids which meet all requirements for a suitable cement kiln fuel, whereas the conventionally obtained material fails some requirements.

What is claimed is:

1. Process for the preparation of a fuel from a refinery waste sludge that contains water, solids and oil which process consists essentially of adding a combustible filter aid having filter aid characteristics of, a porosity of 2 to 100 Darcy, a density of 5 to 1200 kg/m$^3$ and a particle size of 5 to 3000 micrometers, and a heating value of at least 1,000 Btu/lb to the refinery waste sludge, and subsequently subjecting the admixture obtained to filtration.

2. Process according to claim 1, in which the filter aid has as characteristic a density of 5 to 1200 kg/m$^3$.

3. Process according to claim 1, in which the filter aid has as characteristics a porosity of about 2 to 100 darcy and an average particle size of 5 to 3000 micrometer.

4. Process according to claim 1, in which the filter aid has a heating value of up to 20,000 Btu/lb.

5. Process according to claim 1, in which the combustible filter aid consists essentially of one or more ground corncob fractions.

6. Process according to claim 5, in which the combustible filter aid contains particles of a ground, predominantly woody, ring containing fractions of corncobs.

7. Process according to claim 1, in which the filtration is carried out under vacuum or under low pressure of nitrogen or another inert gas to retain oil in the product.

8. Process according to claim 1, in which the product obtained after filtration is dried.

9. Process according to claim 8, in which the drying is carried out at a temperature slightly above the boiling point of water at the prevailing pressure to retain oil in the product.

10. Process according to claim 8, in which the product obtained after filtration is dried to a moisture content of less than 10 percent by weight, based on the total product.

11. Process according to claim 8, in which the addition of the filter aid to the waste sludge, the filtration and the drying are all carried out in a single vessel.

12. Process according to claim 1, in which the filter aid is added to the waste sludge in an amount ranging from 5 to 200% wt, based on solids in waste sludge.

13. Combustible material consisting essentially of oil, refinery waste solids and a filter aid with filter aid characteristics of, a porosity of 2 to 100 Darcy, a density of 5 to 1200 kg/m$^3$ and a particle size of 5 to 3000 micrometers, and a heating value of at least 1,000 Btu/lb.

14. Combustible material according to claim 13, in which the filter aid comprises particles of a ground predominantly woody ring containing fraction of corncobs essentially free of the chaff and pith portion of the cob.

15. Combustible material according to claim 13, which has been prepared by a process as claimed in claim 1.

16. Combustible material according to claim 13, which has a heating value of at least 5,000 Btu/lb.

17. Combustible material according to claim 13, which comprises from about 10 to 90% wt of waste solids, from about 5 to 75% wt of oil and from about 5 to 50% wt of filter aid, based on total material.

18. Combustible material according to claim 17, which contains less than 10% wt of water, based on total material.

19. Process for the preparation of cement clinker, in which cement starting material is fed to a kiln at one end and cement clinker is withdrawn therefrom at the other end, and solid fuel is combusted with a free oxygen-containing gas at the other end of the kiln and combustion gases are passed counter-currently to the cement starting material through the kiln to heat the cement starting material, in which process a combustible material is used as solid fuel that consists essentially of oil, refinery waste solids and a combustible filter aid with filter aid characteristics of, a porosity of 2 to 100 Darcy, a density of 5 to 1200 kg/m$^3$ and a particle size of 5 to 3000 micrometers, and a heating value of at least 1,000 Btu/lb.

20. Process according to claim 19, in which the filter aid comprises particles of a ground predominantly woody ring containing fraction of corncobs.

* * * * *